US011663502B2

(12) United States Patent
Ishida

(10) Patent No.: US 11,663,502 B2
(45) Date of Patent: May 30, 2023

(54) INFORMATION PROCESSING APPARATUS AND RULE GENERATION METHOD

(71) Applicant: FUJITSU LIMITED, Kawasaki (JP)

(72) Inventor: Tsutomu Ishida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 794 days.

(21) Appl. No.: 16/668,913

(22) Filed: Oct. 30, 2019

(65) Prior Publication Data

US 2020/0151585 A1 May 14, 2020

(30) Foreign Application Priority Data

Nov. 9, 2018 (JP) .............................. JP2018-211716

(51) Int. Cl.
| | |
|---|---|
| *G06N 5/025* | (2023.01) |
| *G06V 20/40* | (2022.01) |
| *G06V 40/20* | (2022.01) |
| *G06F 16/75* | (2019.01) |
| *G06V 10/764* | (2022.01) |
| *G06V 10/82* | (2022.01) |

(52) U.S. Cl.
CPC ............. *G06N 5/025* (2013.01); *G06F 16/75* (2019.01); *G06V 10/764* (2022.01); *G06V 10/82* (2022.01); *G06V 20/41* (2022.01); *G06V 20/46* (2022.01); *G06V 40/20* (2022.01)

(58) Field of Classification Search
CPC ........... G06N 3/08; G06N 20/00; G06N 3/02; G06N 5/00; G06N 5/025; G06F 16/901; G06F 16/738; G06F 16/75; G06V 20/40; G06V 40/16; G06V 10/762; G06V 10/24; G06V 20/41; G06V 40/20; G06V 10/764; G06V 10/82; G06V 20/46
See application file for complete search history.

(56) References Cited

U.S. PATENT DOCUMENTS

2014/0205158 A1* 7/2014 Fukazawa ............. G06F 16/739
382/118
2014/0328570 A1* 11/2014 Cheng ................ H04N 21/8549
386/241

(Continued)

FOREIGN PATENT DOCUMENTS

CN 108009516 A * 5/2018

OTHER PUBLICATIONS

Objects as Attributes for Scene Classification—2012 (Year: 2012).*

(Continued)

*Primary Examiner* — Nizar N Sivji
(74) *Attorney, Agent, or Firm* — Fujitsu Patent Center

(57) ABSTRACT

An information processing apparatus includes: a memory; and a processor coupled to the memory and the processor configured to: acquire a plurality of sample videos; identify a position and time at which an attribute appears in each of the plurality of sample videos, the attribute being output by each of one or more pre-trained models to which each of the plurality of sample videos is input; cluster attribute labels based on the position and time of the attribute for each of the plurality of sample videos; and generate a rule by combining attribute labels included in a cluster having a highest frequency of appearance among cluster groups obtained for all of the plurality of sample videos.

15 Claims, 10 Drawing Sheets

(56) References Cited

U.S. PATENT DOCUMENTS

| | | | |
|---|---|---|---|
| 2018/0075300 A1* | 3/2018 | Mai | G06V 10/24 |
| 2018/0082127 A1* | 3/2018 | Carlson | G06V 10/40 |
| 2019/0013047 A1* | 1/2019 | Wait | G11B 27/031 |
| 2019/0258671 A1* | 8/2019 | Bou | G06F 40/30 |
| 2020/0020165 A1* | 1/2020 | Tran | G06N 20/10 |

OTHER PUBLICATIONS

A Structured Model of Video Reproduces Primary Visual Cortical Organisation—2009 (Year: 2009).*
Review of Action Recognition and Detection Methods—2016 (Year: 2016).*
Efficient Facial Representations for Age, Gender and Identity Recognition in Organizing Photo Albums using Multi-output CNN—2019 (Year: 2019).*
Human Face Based Approach For Video Summarization—2013 (Year: 2013).*
Identification of pedestrian attributes based on video sequence—2018 (Year: 2018).*
Li, Li-Jia et al., "Objects as Attributes for Scene Classification", ECCV 2010 Workshops, Part I, LNCS 6553, pp. 57-69, 2012.

* cited by examiner

INFORMATION PROCESSING APPARATUS AND RULE GENERATION METHOD

CROSS-REFERENCE TO RELATED APPLICATION

This application is based upon and claims the benefit of the prior Japanese Patent Application No. 2018-211716 filed on Nov. 9, 2018, the entire contents of which are incorporated herein by reference.

FIELD

The embodiments discussed herein are related to an information processing apparatus and a rule generation method.

BACKGROUND

A technique of retrieving a specific scene from a video may be applied to various solutions. For example, scenes such as motions that display interest in shops and advertisements, etc., suspicious movements, lost children, or rear-end collisions of vehicles may be searched from the videos obtained from a surveillance camera. From the aspect of implementing such a video search, a model of recognizing a specific scene, for example, recurrent neural networks (RNN), etc. may be learned by deep learning.

Related technologies are disclosed in, for example, Li-Jia Li, Hao Su, Yongwhan Lim, Li Fei-Fei, "Objects as Attributes for Scene Classification," ECCV 2010 Workshops, Part I, LNCS 6553, pp. 57-69, 2012.

When a model learning is performed by deep learning, the cost of training data increases. For example, in the case of deep learning, it is required to prepare training data used for model learning on the order of thousands or tens of thousands. There is an aspect that it is difficult to prepare training data in such an order. Further, in the case of supervised learning, each training data needs to be given a correct label, and there is also an aspect that it takes time to assign the label. Thus, when model learning is performed by deep learning, the cost of training data increases in various aspects such as quantity and labor.

SUMMARY

According to an aspect of the embodiments, an information processing apparatus includes: a memory; and a processor coupled to the memory and the processor configured to: acquire a plurality of sample videos; identify a position and time at which an attribute appears in each of the plurality of sample videos, the attribute being output by each of one or more pre-trained models to which each of the plurality of sample videos is input; cluster attribute labels based on the position and time of the attribute for each of the plurality of sample videos; and generate a rule by combining attribute labels included in a cluster having a highest frequency of appearance among cluster groups obtained for all of the plurality of sample videos.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Embodiments will be described below with reference to the accompanying drawings. Meanwhile, the embodiments do not limit the disclosed technology. Each embodiment may be appropriately combined within a range in which processing contents are not contradictory.

First Embodiment (System Configuration)

Figure 1:
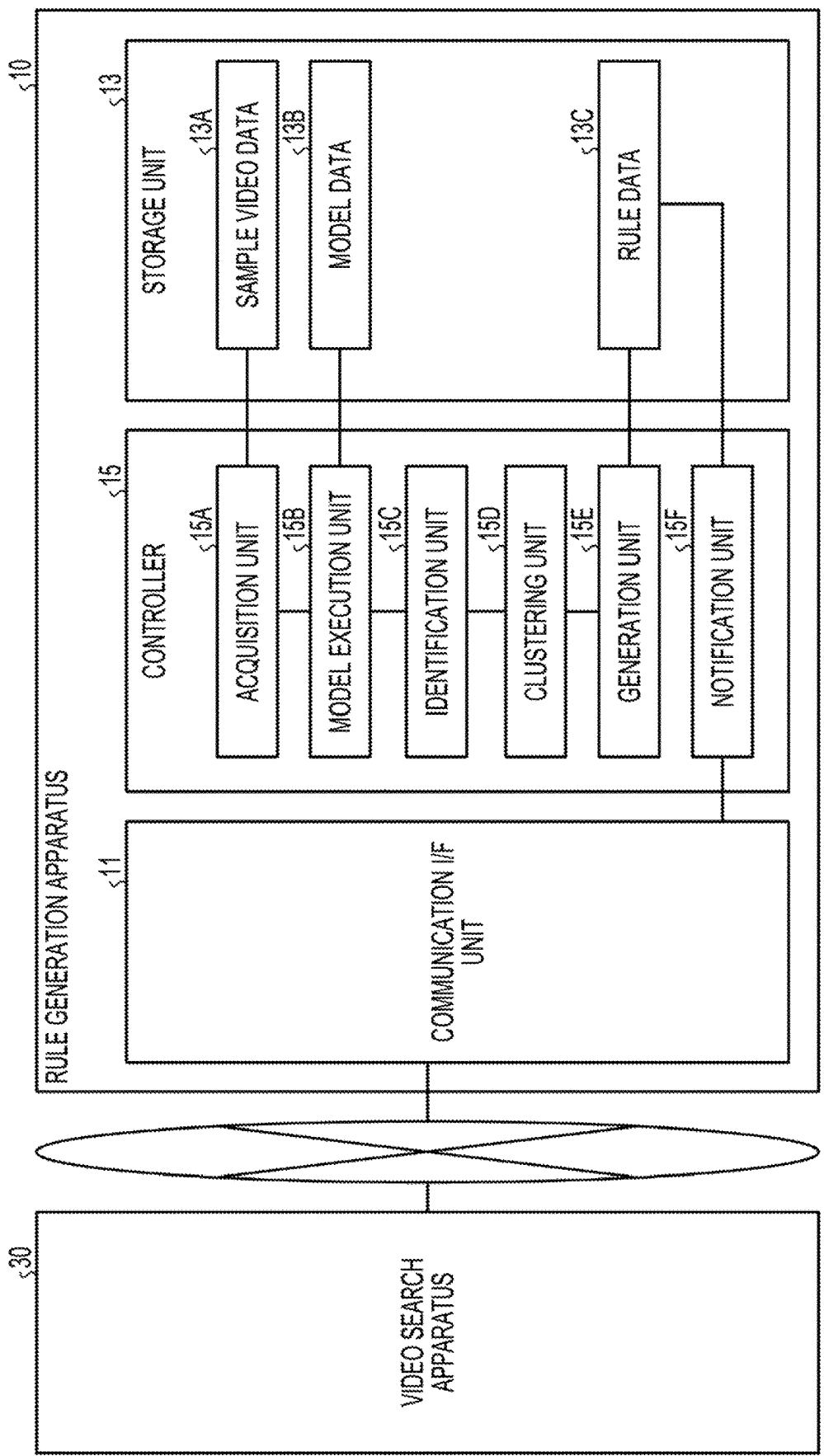
FIG. 1 is a block diagram illustrating an example of a functional configuration of a rule generation apparatus included in a system according to a first embodiment.

FIG. 1 is a block diagram illustrating an example of a functional configuration of a rule generation apparatus included in a system according to a first embodiment. In the system 1 illustrated in FIG. 1, a rule generation service of generating a rule used for extracting a specific scene from a video, and a video search service of searching for a specific scene from the video according to the above rule are provided.

As illustrated in FIG. 1, the system 1 includes a rule generation apparatus 10 and a video search apparatus 30. Here, in FIG. 1, a system in which two machines of the rule generation apparatus 10 and the video search apparatus 30 are separately constructed is taken as an example. In this case, the rule generation apparatus 10 and the video search apparatus 30 may exchange data via network communication.

The rule generation apparatus 10 corresponds to an example of a computer (information processing rule apparatus) that provides the rule generation service.

According to an embodiment, the rule generation apparatus 10 may be implemented by installing a rule generation program that implements a function corresponding to the rule generation service as package software or online software on an arbitrary computer. For example, the rule generation apparatus 10 may be implemented on-premises as a server that provides the above rule generation service, or may be implemented as a cloud that provides the above rule generation service by an outsourcing.

The video search apparatus 30 corresponds to an example of a computer that provides the video search service.

According to an embodiment, the video search apparatus 30 may be implemented by installing a video search program that implements a function corresponding to the video search service as package software or online software on an arbitrary computer. For example, the video search apparatus 30 may be implemented on-premises as a server that provides the video search service, or may be implemented as a cloud that provides the video search service by outsourcing. In addition, a video information source to which the above video search service is applied, for example, an edge server located closest to a surveillance camera or the like may be implemented as the video search apparatus 30.

The rule generation service and the video search service do not necessarily have to be provided by different operators, but may be provided by the same operator. In this case, the rule generation apparatus 10 and the video search apparatus 30 do not necessarily have to be individually constructed, and a series of services in which the rule generation service and the video search service are packaged may be provided as a cloud service.

As described above, when a model learning is performed by deep learning, the cost of training data increases. For example, in terms of quantity, it is necessary to prepare training data used for model learning on the order of thousands or tens of thousands. In addition, in terms of labor, each training data needs to be given a correct label, and it takes time to assign the label.

For this reason, the rule generation apparatus 10 according to the present embodiment does not employ an approach of learning a model that recognizes a specific scene by deep learning. Instead, the rule generation apparatus 10 according to the present embodiment employs an approach in which a pre-trained model that outputs an attribute label when a video is input is used for video search.

Here, the pre-trained model refers to a model for which machine learning has been executed, and includes, for example, a model for which machine learning has been performed by deep learning. For example, the pre-trained model does not necessarily have to be developed solely by an operator that provides the rule generation service, but may be an open source library in which the model structure and parameters are disclosed online, etc.

As described above, the pre-trained model described above may be an arbitrary model as long as machine learning has been executed, whereas the attribute label output by the pre-trained model to which the video is input is not necessarily specific to recognizing a specific scene.

Therefore, from the aspect of implementing a function of recognizing a specific scene using the above pre-trained model, the rule generation apparatus 10 according to the present embodiment generates a rule capable of detecting a specific scene based on a combination of attribute labels output by the pre-trained model. For example, a sample video including a specific scene is input to a pre-trained model, and a rule is generated from a combination of attribute labels output from the pre-trained model. A video including a specific scene is searched by comparing the rules generated in this way with the attribute labels which are obtained by inputting any information source, for example, the video acquired from a surveillance camera, etc. into the pre-trained model.

Figure 2:
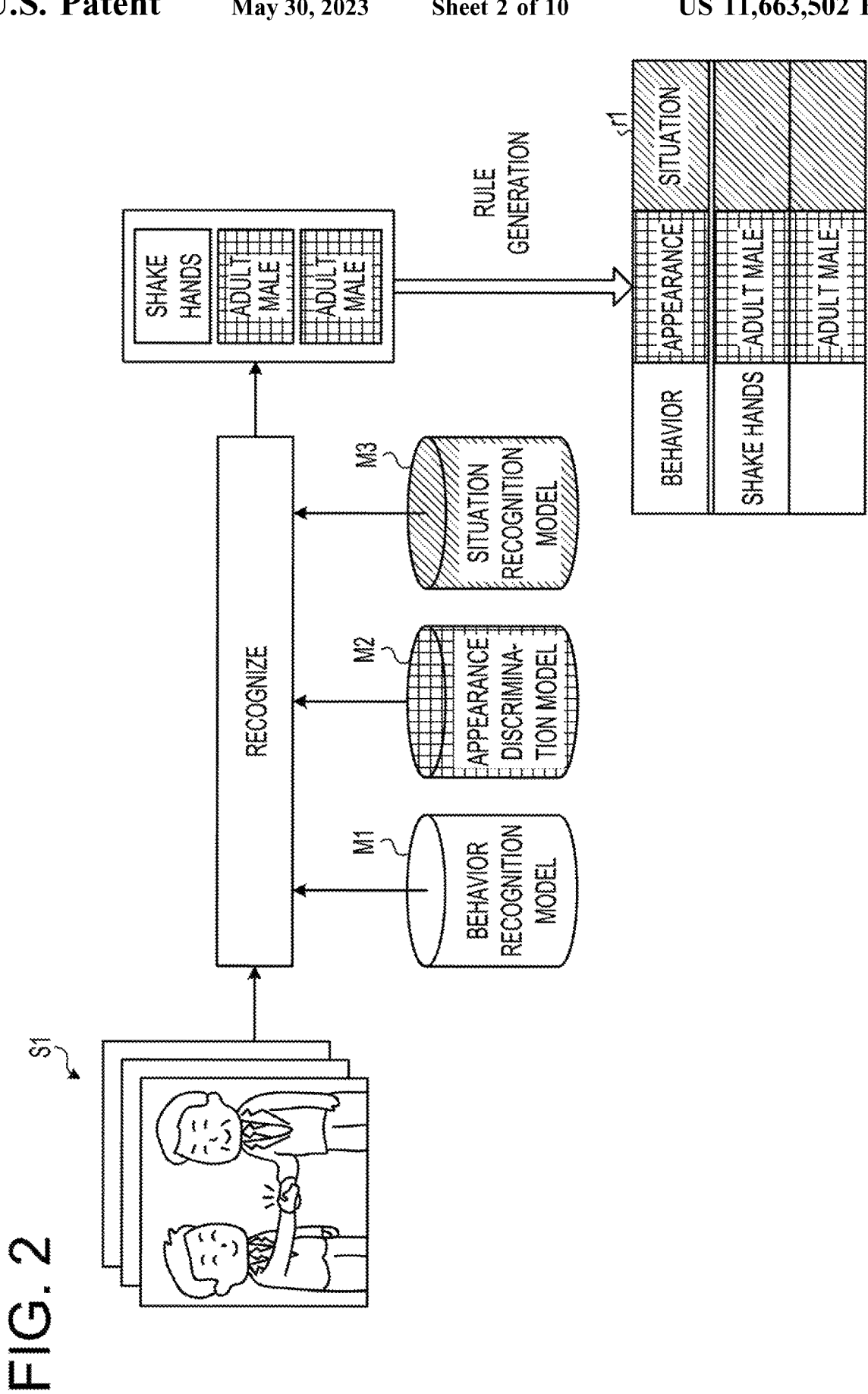
FIG. 2 is a diagram illustrating an example of a rule generation method.

FIG. 2 is a diagram illustrating an example of a rule generation method. FIG. 2 illustrates a sample video s1 including a scene in which two males shake hands as an example of a specific scene. Further, FIG. 2 illustrates three pre-trained models, that is, a behavior recognition model M1, an appearance discrimination model M2, and a situation recognition model M3, as examples of pre-trained models. Meanwhile, FIG. 2 illustrates an example in which three pre-trained models are used for rule generation, but the number of the pre-trained models may be one, two, or four or more, and may be other types of pre-trained models.

Among the pre-trained models, the behavior recognition model M1 corresponds to a pre-trained model that outputs labels of behavior elements such as "walk," "run," "shake hands," and "hold" as an example of attributes when a video is input. Further, the appearance discrimination model M2 corresponds to a pre-trained model that outputs labels of appearances such as "adult male" and "adult female," for example, a label of "age+gender" as an example of attributes when a video is input. In addition, the situation recognition model M3 corresponds to a pre-trained model that outputs labels of background such as "outdoor," "indoor," "tree," "grass," and "road" as an example of attributes when a video is input.

As illustrated in FIG. 2, the sample video s1 is input to three pre-trained models of the behavior recognition model M1, the appearance discrimination model M2, and the situation recognition model M3. As a result, the behavior recognition model M1 outputs a label L1 of the behavior element "shake hands." Further, the appearance discrimination model M2 outputs a label L2 of the appearance "adult male" and a label L3 of the appearance "adult male." Meanwhile, in the example of the sample video s1 illustrated in FIG. 2, since the background is masked in white, no output may be obtained from the situation recognition model M3.

A rule r1 is generated from the label L1 of the behavior element "shake hands," the label L2 of the appearance "adult male," and the label L3 of the appearance "adult male" which are obtained in this way. For example, in the example illustrated in FIG. 2, the label L1 of the behavior element "shake hands," the label L2 of the appearance "adult male," and the label L3 of the appearance "adult male" are connected under an AND condition, so that the rule r1 is generated. According to such rule r1, it becomes possible for the behavior recognition model M1 to output the label of the behavior element "shake hands" and for the appearance discrimination model M2 to extract the label of the appearance "adult male" and the video of a frame that outputs the label of the appearance "adult male."

By generating such a rule, it becomes possible to reduce the cost of training data as compared to a case where machine learning of a model is performed by deep learning. For example, in the case of deep learning, it is required to prepare training data used for model learning on the order of thousands or tens of thousands. However, when generating a rule by combining attribute labels, it is sufficient to prepare a sample video with an order of about one digit. Further, it is sufficient that the sample video used for generating the rule includes a specific scene, and it is not necessary to add a label corresponding to the correct class.

As described above, when the rule is generated by combining the attribute labels output by a pre-trained model to which a sample video is input, the cost of training data may be reduced, while it is difficult to appropriately create a rule for extracting a specific scene.

Figure 3:
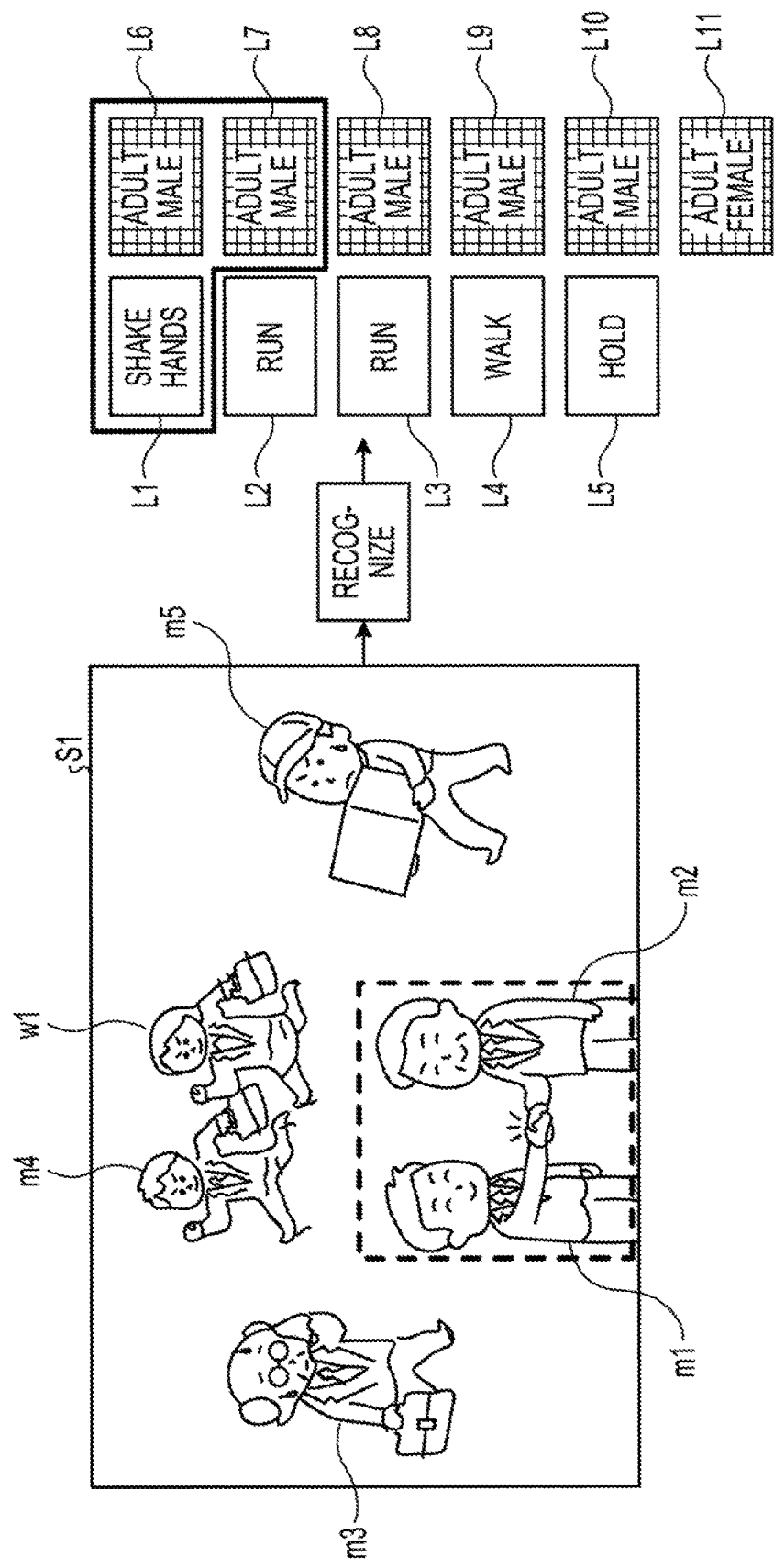
FIG. 3 is a diagram illustrating an example of attribute labels output by a pre-trained model.

FIG. 3 is a diagram illustrating an example of attribute labels output by the pre-trained model. FIG. 3 illustrates a sample video S1 that includes a scene in which two males m1 and m2 shake hands as an example of a specific scene, and a scene that is unrelated to the specific scene as noise. Further, FIG. 3 illustrates, as an example of the pre-trained model, three pre-trained models of the behavior recognition model M1, the appearance discrimination model M2, and the situation recognition model M3, as in the example illustrated in FIG. 2.

As illustrated in FIG. 3, in addition to the specific scene illustrating that the two males m1 and m2 shake hands with broken lines, a scene unrelated to the specific scene is included as noise. For example, the sample video S1 includes a male m3 who walks from left to right in the frame of the sample video S1, a male m4 and a female w1 who run from right to left in the frame of the sample video S1, and a male m5 who carries luggage. By including such noise in the sample video S1, noise is also generated in the attribute label output by the pre-trained model.

For example, when the sample video S1 is input to three pre-trained models of the behavior recognition model M1, the appearance discrimination model M2, and the situation recognition model M3, the following attribute labels are output from the three pre-trained models. That is, the behavior recognition model M1 includes the label L1 of the behavior element "shake hands," the label L2 of the behavior element "run," the label L3 of the behavior element "run," a label L4 of the behavior element "walk," and a label L5 of the behavior element "hold." In addition, the appearance discrimination model M2 outputs a label L6 of the appearance "adult male," a label L7 of the appearance "adult male," a label L8 of the appearance "adult male," a label L9 of the appearance "adult male," a label L10 of the appearance "adult male," and a label L11 of the appearance "adult female." Meanwhile, since the background is also masked in white in the example of the sample video S1 illustrated in FIG. 3, no output may be obtained from the situation recognition model M3.

Here, it is intended from the sample video S1 that attributes labels corresponding to a specific scene in which two males m1 and m2 shake hands, that is, the label L1, the label L6, and the label L7 are used to generate a rule. However, since the attribute labels L2 to L5 and the labels L8 to L11 are noises, it is difficult to identify and use only the attribute labels L1, L6, and L7 corresponding to a specific scene.

Therefore, the rule generation apparatus 10 according to the present embodiment clusters attribute labels based on the position and time at which an object corresponding to the attribute output by the pre-trained model, to which the sample video is input for each sample video, appears in the sample video. In addition, the rule generation apparatus 10 according to the present embodiment generates a rule based on a cluster having the highest frequency of appearance among cluster groups obtained for all the sample videos as a result of clustering for each sample video.

Figure 4:
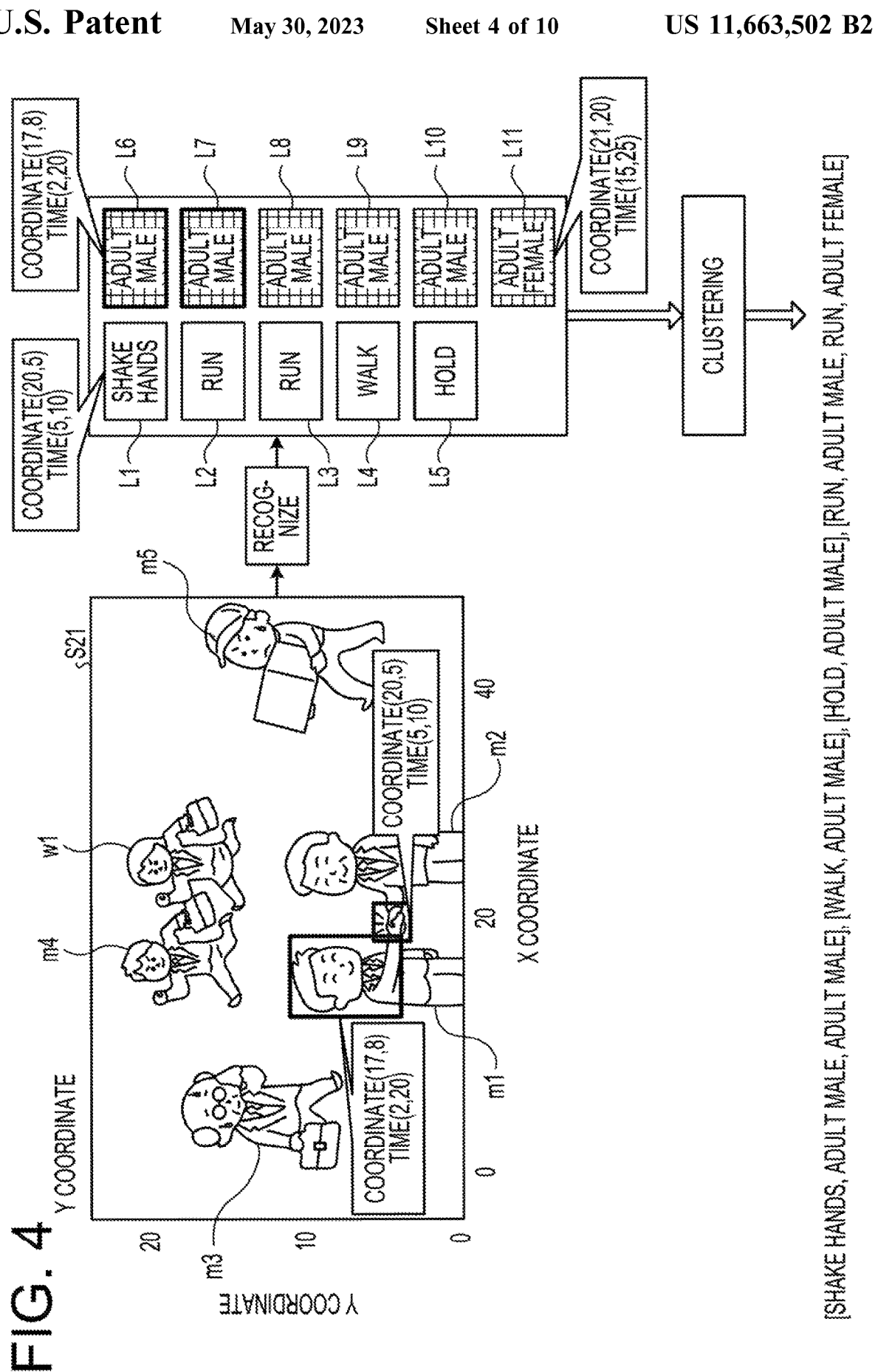
FIG. 4 is a diagram illustrating an example of a rule generation method.

FIG. 4 is a diagram illustrating an example of a rule generation method. FIG. 4 illustrates a sample video S1 that includes a scene where two males m1 and m2 shake hands as an example of a specific scene, and a scene unrelated to the specific scene as noise, as in the example illustrated in FIG. 3. Further, FIG. 4 illustrates three pre-trained models of the behavior recognition model M1, the appearance discrimination model M2, and the situation recognition model M3 as examples of the pre-trained models, as in the examples illustrated in FIGS. 2 and 3.

As illustrated in FIG. 4, when the sample video S1 is input to three pre-trained models of the behavior recognition model M1, the appearance discrimination model M2, and the situation recognition model M3, the same attribute labels as in the example illustrated in FIG. 3 are output from the three pre-trained models.

For each attribute label obtained in this way, the rule generation apparatus 10 according to the present embodiment identifies the position and time at which an object corresponding to the attribute appears in the sample video S1. For example, when the object corresponding to the attribute is detected as a rectangular object on the sample video S1, the coordinates of the center of the rectangular object may be identified as an example of the position. Further, as an example of time, it is possible to identify a frame in which an object corresponding to an attribute appears in a frame included in the sample video S1 or a time interval associated with the frame.

Hereinafter, as an example only, descriptions will be made on a case where the coordinates in a coordinate system having the origin at the lower left vertex of the sample video S1 are used for position identification. In addition, as an example only, descriptions will be made below on a case where the number of a first frame among the frames included in the sample video S1 is referred to as "1" and the sequence number assigned to the subsequent frames, so-called frame number, is used for time identification.

In the example of the label L1 of the behavior element "shake hands" illustrated in FIG. 4, a representative value of the coordinates of the center point of the object, for example, a statistical value such as an average value, a median value, or a most frequent value is calculated for the frames of the sample video S1 in which the object corresponding to the behavior element "shake hands" appears. Thus, the position (20, 5) where the object corresponding to the behavior element "shake hands" appears on the sample video S1 is identified. Further, a section of frame numbers "5" to "10" of the sample video in which an object corresponding to the behavior element "shake hands" appears is identified as time (5, 10). Such position and time identification is performed for each of the attribute labels L1 to L11.

After the position and time are identified for each of the attribute labels L1 to L11 in this way, the rule generation apparatus 10 according to the present embodiment clusters the attribute labels L1 to L11 based on the position and time of the attribute labels L1 to L11.

In the example illustrated in FIG. 4, the label L1 of the behavior element "shake hands," the label L6 of the appearance "adult male," and the label L7 of the appearance "adult male" are classified into the same cluster. Further, the label L4 of the behavior element "walk" and the label L8 of the appearance "adult male" are classified into the same cluster. Further, the label L5 of the behavior element "hold" and the label L9 of the appearance "adult male" are classified into the same cluster. Further, the label L2 of the behavior element "run," the label L10 of the appearance "adult male," the label L3 of the behavior element "run," and the label L11 of the appearance "adult female" are classified into the same cluster.

By clustering the attribute labels based on the position and time at which the object corresponding to the attribute appears in the sample video S1 in this way, even when the sample video S1 includes a plurality of scenes, each of the scenes may be separated. For example, the attribute labels L1 to L11 are separated into the following four clusters. For example, a cluster corresponding to a specific scene in which two males m1 and man m2 shake hands is included. Further, a cluster corresponding to a scene in which the male m3 walks from left to right in the frame of the sample video S1 is included. Further, a cluster corresponding to a scene in which the male m5 carries luggage is included. Further, a cluster corresponding to a scene in which the male m4 and the female w1 run from right to left in the frame of sample video S1 is included.

In addition, the rule generation apparatus 10 according to the present embodiment generates a rule based on the cluster group obtained as a result of clustering for each sample video. That is, in the example illustrated in FIG. 4, the sample video S1 is input to the three pre-trained models. However, in addition to the sample video S1, the sample video including a specific scene is input to the three pre-trained models. In the sample videos other than the sample video S1, cluster groups are similarly obtained by performing clustering. In this way, among the cluster groups obtained for all the sample videos, the frequency at which a cluster corresponding to a specific scene appears is likely to be the highest among cluster groups obtained for all the sample videos. The grounds for the likeliness are that when a video including a specific scene is selected as a sample video, and even when the sample video contains a scene that causes noise, the type of noise is likely to be different for each sample video, and the like.

From the foregoing, the rule generation apparatus 10 according to the present embodiment generates a rule using the most frequent cluster which has the highest frequency of appearance among the cluster groups obtained for all the sample videos. That is, in the example illustrated in FIG. 4, a set of the label L1 of the behavior element "shake hands," the label L6 of the appearance "adult male," and the label L7 of the appearance "adult male" is used to generate the rule. For example, the label L1 of the behavior element "shake hands," the label L6 of the appearance "adult male," and the label L7 of the appearance "adult male" are connected by the AND condition, thereby generating the rule r1. According to such rule r1, it becomes possible for the behavior recognition model M1 to output the label of the behavior element "shake hands" and for the appearance discrimination model M2 to extract the label of the appearance "adult male" and the video of a frame that outputs the label of the appearance "adult male."

Therefore, in the rule generation apparatus 10 according to the present embodiment, the cost of training data may be reduced. Further, in the rule generation apparatus 10 according to the present embodiment, even when the sample video includes noise other than the specific scene, the rule may be generated by combining the labels of the attributes corresponding to the specific scene.

(Configuration of Rule Generation Apparatus 10)

Next, a functional configuration of the rule generation apparatus 10 according to the present embodiment will be described. As illustrated in FIG. 1, the rule generation apparatus 10 includes a communication interface (I/F) unit 11, a storage unit 13, and a controller 15. Meanwhile, in FIG. 1, a solid line indicating the relationship of data exchange is illustrated, but only a minimum part is illustrated for the convenience of explanation. That is, the input/output of data related to each processing unit is not limited to the illustrated example, and the input/output of data other than those illustrated, for example, the input/output between the processing units, between the processing unit and the data, and between the processing unit and an external device may be performed.

The communication I/F unit 11 corresponds to an interface that performs a communication control with other devices such as the video search apparatus 30.

According to an embodiment, the communication I/F unit 11 corresponds to a network interface card such as a local area network (LAN) card. For example, the communication I/F unit 11 receives a sample video used to generate a rule, a rule creation instruction, and the like from the video search apparatus 30, and notifies a rule generated from the sample video and the like.

The storage unit 13 is a functional unit that stores data used for various programs such as an operating system (OS) executed by the controller 15, and middleware and application programs, for example, the rule generation program described above.

According to an embodiment, the storage unit 13 may be implemented as an auxiliary storage device in the rule generation apparatus 10. For example, the storage unit 13 may employ a hard disk drive (HDD), an optical disk, a solid state drive (SSD), or the like. Meanwhile, the storage unit 13 does not necessarily have to be mounted as an auxiliary storage device, and may also be mounted as a main storage device in the rule generation apparatus 10. In this case, various semiconductor memory elements such as a random access memory (RAM) and a flash memory may be employed for the storage unit 13.

The storage unit 13 stores sample video data 13A, model data 13B, and rule data 13C as an example of data used in a program executed by the controller 15. In addition to such data, the storage unit 13 may be configured to store other electronic data, such as an account of the user of the rule generation service. Meanwhile, the description of the sample video data 13A, the model data 13B, and the rule data 13C will be described together with the description of the controller 15 that acquires, references, generates, or registers each data.

The controller 15 is a processing unit that performs the entire control of the rule generation apparatus 10.

According to an embodiment, the controller 15 may be implemented by a hardware processor such as a central processing unit (CPU) or a micro processing unit (MPU). Here, CPUs and MPUs are illustrated as examples of processors. However, regardless of general-purpose types or specialized types, the controller 15 may be implemented by arbitrary processors such as a graphics processing unit (GPU) and a digital signal processor (DSP), as well as a deep learning unit (DLU) and a general-purpose computing on graphics processing units (GPGPU). In addition, the controller 15 may be implemented by hard wired logic such as an application specific integrated circuit (ASIC) or a field programmable gate array (FPGA).

The controller 15 virtually implements the following processing unit by deploying the above rule generation program on a work area of the RAM mounted as a main storage device (not illustrated). In this example, an example is given in which a rule generation program in which functions corresponding to the rule generation service are packaged is executed. However, a packaged program that further includes a function corresponding to the video search service may be executed. In addition, among the functions provided by the rule generation service, a program module may be executed or a library may be referred to in units of certain functions.

As illustrated in FIG. 1, the controller 15 includes an acquisition unit 15A, a model execution unit 15B, an identification unit 15C, a clustering unit 15D, a generation unit 15E, and a notification unit 15F.

The acquisition unit 15A is a processing unit that acquires a sample video.

As an aspect, the acquisition unit 15A starts processing when a data set including a plurality of sample videos is additionally registered in the sample video data 13A in the storage unit 13 or when a rule generation request is received.

Then, the acquisition unit 15A acquires a data set including a plurality of sample videos by reading the sample video data 13A stored in the storage unit 13. The sample video acquired in this way includes specific scenes that are desired to be searched from the video, for example, scenes such as motions of interest in shops, advertisements, etc., suspicious motions, lost children, or rear-end collisions of vehicles. In this example, the data set is acquired from the storage unit 13. However, the data set may be configured to be acquired from an external computer connected via a network, for example, a file server, a removable medium, or the like.

The model execution unit 15B is a processing unit that executes the pre-trained model.

According to an embodiment, when a data set is acquired by the acquisition unit 15A, the model execution unit 15B refers to the model data 13B stored in the storage unit 13 and deploys a work area that does not illustrate an arbitrary number of the pre-trained models. The layer structure of models such as neurons and synapses in each layer of an input layer, a hidden layer, and an output layer that form a neural network, and model parameters such as weight and bias of each layer are referred to in the deployment of the pre-trained model. In addition, the model execution unit 15B inputs the sample video to the pre-trained model for each sample video included in the data set. As a result, the attribute label output by the pre-trained model may be obtained for each sample video.

The identification unit 15C is a processing unit that identifies the position and time at which the object corresponding to the attribute appears in the sample video for each attribute label output by the pre-trained model.

According to an embodiment, when the object corresponding to the attribute is detected as a rectangular object on the sample video, the identification unit 15C may identify the coordinates of the center of the rectangular object as an example of the position. Further, as an example of time, the identification unit 15C may identify a frame in which an object corresponding to an attribute appears, or a time interval associated with the frame among frames included in the sample video S1. Such position and time identification is performed for each attribute label.

More specifically, the identification unit 15C calculates a representative value of the coordinates of the center point of the object for the frames of the sample video in which the object corresponding to the attribute appears, for example, a statistical value such as an average value, a median value, or a most frequent value. Thus, even when the object corresponding to the attribute is a moving object, the position where the object appears on the sample video may be identified. Here, an example of using the coordinates of the center point of the object to identify the position is given. However, the center point does not necessarily have to be used, and a representative point such as any of the five cores including the center of gravity, the circumcenter, the inner center, the excenter, and an orthocenter, may be used. Further, the identification unit 15C identifies the section of the frame number of the sample video in which the object corresponding to the attribute appears as the time. Here, an example in which time is identified by the section of the frame number has been described as an example only, but the present disclosure is not limited to this. For example, the above term "time" may be represented by a set of frame numbers. The term "set" referred to herein may be a set of continuous values of frame numbers, or may be a set of discrete values of frame numbers.

The clustering unit 15D is a processing unit that clusters attribute labels based on the position and time of each attribute label. Here, any method such as hierarchical clustering or split optimization clustering may be applied to clustering of attribute labels.

The generation unit 15E is a processing unit that generates a rule based on the most frequent cluster having the highest frequency of appearance among the cluster groups obtained for all the sample videos.

According to an embodiment, the generation unit 15E uses the most frequent cluster among the cluster groups obtained for each sample video to generate a rule. For example, the generation unit 15E generates a rule by connecting the attribute labels included in the most frequent cluster using an AND condition. The rule generated in this way is stored in the storage unit 13 as rule data 13C.

The notification unit 15F is a processing unit that notifies a rule.

According to an embodiment, the notification unit 15F notifies the rule generated by the generation unit 15E or the rule data 13C stored in the storage unit 13 to a predetermined output destination, for example, the video search apparatus 30. In addition, the notification unit 15F may also output information corresponding to the pre-trained model that outputs the label of the attribute included in the rule among the model data 13B stored in the storage unit 13 to a predetermined output destination.

(Specific Example of Rule Generation Method)

Figure 5:
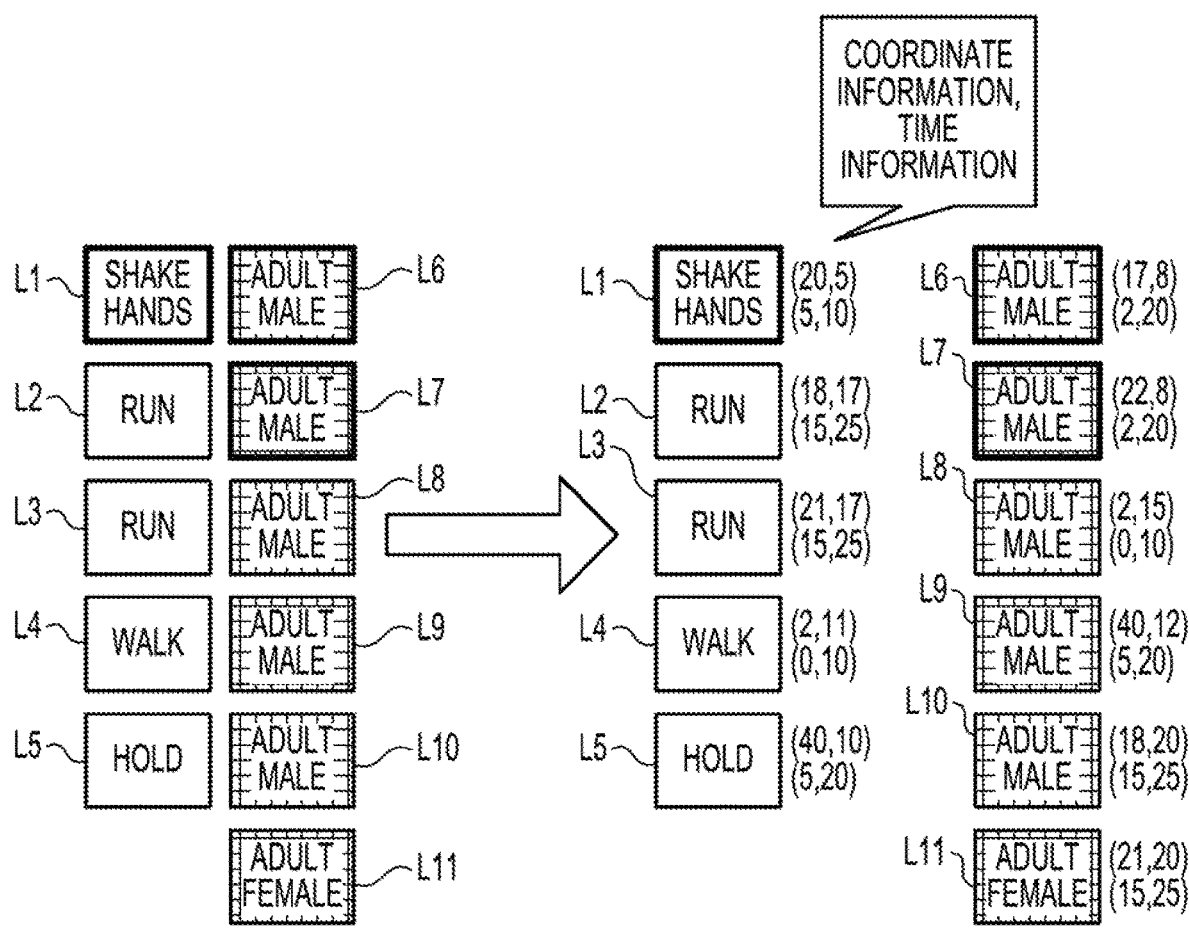
FIG. 5 is a diagram illustrating an example of a position and time identification result.

Hereinafter, a specific example of a rule generation method will be described with reference to FIGS. 5 to 7. FIG. 5 is a diagram illustrating an example of a position and time identification result. The left side of FIG. 5 illustrates the attribute labels L1 to L11 which are obtained by inputting the sample video S1 illustrated in FIG. 4 to the three pre-trained models of the behavior recognition model M1, the appearance discrimination model M2, and the situation recognition model M3. Meanwhile, in FIGS. 5 and 6, the outer frames of the attribute labels L1, L6, and L7 are indicated by a thick line so that a specific scene intended for video search, for example, the attribute labels L1, L6, and L7 corresponding to two males m1 and m2 shaking hands may be easily distinguished among the attribute labels corresponding to the scenes that cause noise.

In the example of the label L1 of the behavior element "shake hands" in the attribute labels L1 to L11, a representative value of the coordinates of the center point of the object, for example, a statistical value such as an average value, a median value, or a most frequent value is calculated for the frames of the sample video S1 in which the object corresponding to the behavior element "shake hands" appears. Thus, the position (20, 5) where the object corresponding to the behavior element "shake hands" appears on the sample video S1 is identified. Further, a section of frame numbers "5" to "10" of the sample video in which the object corresponding to the behavior element "shake hands" appears is identified as time (5, 10). In this way, the position and time are identified for each of the attribute labels L1 to L11. Thus, as illustrated on the right side of FIG. 5, the position and time identification results are obtained for each of the attribute labels L1 to L11. After the positions and times are identified for the attribute labels L1 to L11 in this way, the attribute labels L1 to L11 are clustered based on the positions and times of the attribute labels L1 to L11.

Figure 6:
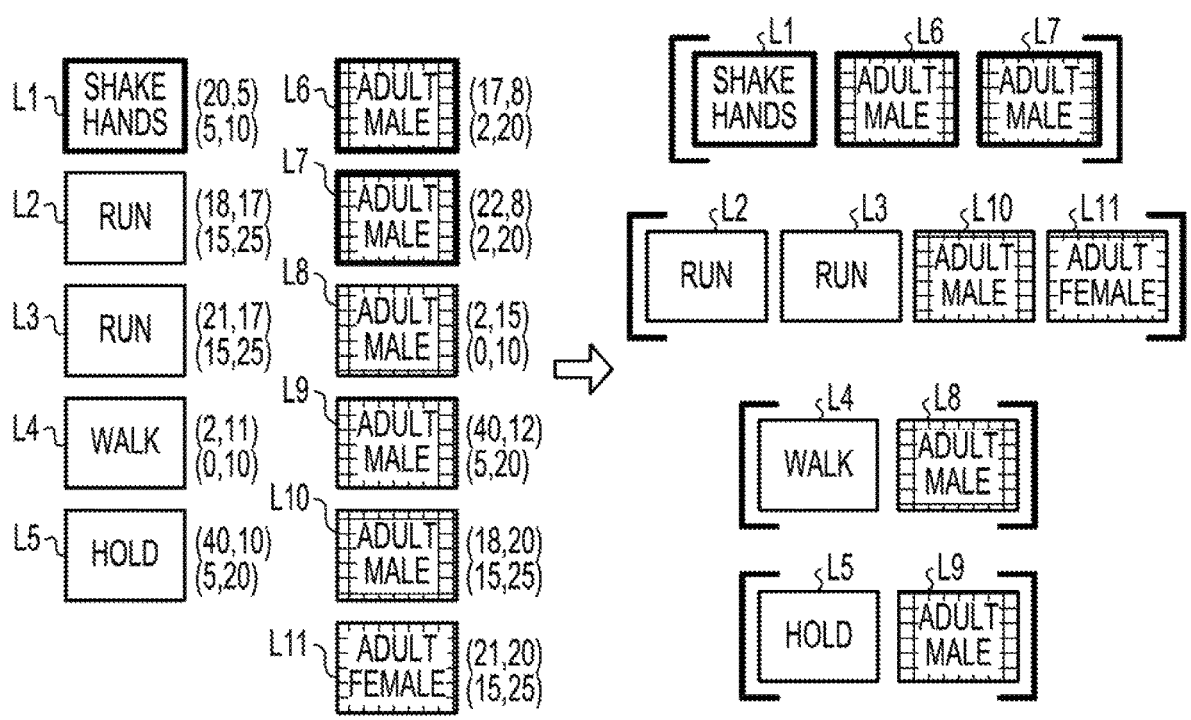
FIG. 6 is a diagram illustrating an example of clustering.

FIG. 6 is a diagram illustrating an example of clustering. The positions and times identified for the attribute labels L1 to L11 are illustrated on the left side of FIG. 6. When clustering is performed based on the positions and times of the attribute labels L1 to L11, four clusters are obtained from the sample video S1, as illustrated on the right side of FIG. 6.

For example, in the case of the first cluster from the top, the positions where objects corresponding to the label L1 of the behavior element "shake hands," the label L6 of the appearance "adult male," and the label L7 of the appearance "adult male" appear on the sample video are (20, 5), (17, 8), and (22, 8). Among the labels L1, L6, and L7, the distance in the X direction is within ±3, and the distance in the Y direction is also within ±3. Therefore, it may be identified that the position is similar among the label L1 of the behavior element "shake hands," the label L6 of the appearance "adult male," and the label L7 of the appearance "adult male." Further, the frame number ranges of the sample video in which the label L1 of the behavior element "shake hands," the label "L6" of the appearance "adult male," and the label L7 of the appearance "adult male" appear are (5, 10), (2, 20), and (2, 20). Thus, the labels L1, L6, and L7 appear simultaneously over 6 frames ranging from frame numbers "5" to "10". For this reason, it may be identified that the time is similar to each other among the label L1 of the behavior element "shake hands," the label L6 of the appearance "adult male," and the label L7 of the appearance "adult male." From similarity in terms of both position and time, the label L1 of the behavior element "shake hands," the label L6 of the appearance "adult male," and the label L7 of the appearance "adult male" are classified into the same cluster. Meanwhile, similar clustering is performed in the other three clusters.

By such clustering, even when the sample video S1 includes a plurality of scenes, each scene may be separated into a set of attribute labels corresponding thereto. For example, a cluster corresponding to a specific scene in which two males m1 and m2 shake hands may be separated. Further, it is possible to separate clusters corresponding to a scene in which the male m3 walks from left to right in the frame of the sample video S1. It is also possible to separate the cluster corresponding to the scene in which the male m5 carries luggage. Further, it is possible to separate clusters corresponding to a scene in which the male m4 and the female w1 run from right to left in the frame of the sample video S1.

In addition to the sample video S1, a cluster group may be obtained from another sample video included in the data set. As described above, among the cluster groups obtained for all the sample videos, a cluster having the highest frequency of appearance is used for rule generation.

Figure 7:
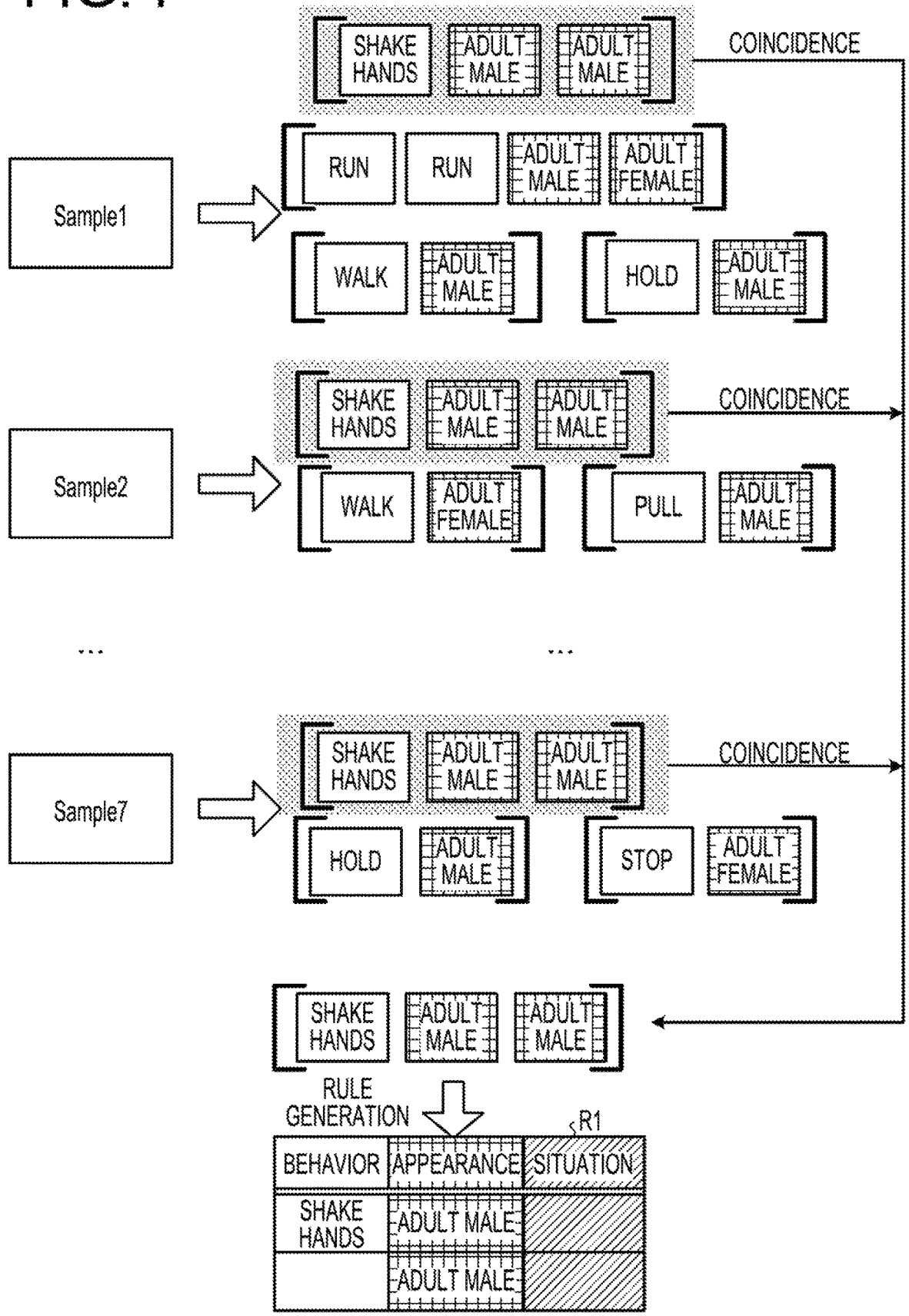
FIG. 7 is a diagram illustrating an example of a cluster group.

FIG. 7 is a diagram illustrating an example of a cluster group. FIG. 7 illustrates a cluster group which is obtained for each of the sample video S2 to the sample video S7 in addition to the cluster group obtained from the sample video S1 illustrated in FIG. 4. For example, in the example illustrated in FIG. 7, a cluster, which is a set of the label of the behavior element "shake hands," the label of the appearance "adult male," and the label of the appearance "adult male," appears in all sample videos S1 to S7 including the sample videos S3 to S6 (not illustrated). In this case, the appearance frequency of the cluster which is a set of the label of the behavior element "shake hands," the label of the appearance "adult male," and the label of the appearance "adult male" is the highest frequency of "7."

Therefore, a set of the label of the behavior element "shake hands," the label of the appearance "adult male," and the label of the appearance "adult male" is used to generate the rule. For example, the rule R1 is generated by connecting the label of the behavior element "shake hands," the label of the appearance "adult male," and the label of the appearance "adult male" under an AND condition. By such rule R1, it becomes possible for the behavior recognition model M1 to output the label of the behavior element "shake hands," and for the appearance discrimination model M2 to extract the label of the appearance "adult male" and a video of the frame that outputs the label of the appearance "adult male."

Meanwhile, in the example illustrated in FIG. 7, an example is given in which a set of the label of the behavior element "shake hands," the label of the appearance "adult male," and the label of the appearance "adult male" appear in all the sample videos S1 to S7. However, there may be a case where the set does not necessarily appear in all the sample videos S1 to S7.

For example, in all the sample videos S1 to S7, it is not always possible to separate the sample videos into clusters corresponding to a specific scene, and the clusters may include extra attribute labels, or certain attribute labels may be missing.

In this way, the following process may be executed from the aspect of counting an excess or deficiency cluster as an appearance frequency of a cluster corresponding to a specific scene. For example, the most frequent cluster having the highest appearance frequency is extracted from all the sample videos S1 to S7. In addition, among the clusters obtained from a sample video in which the most frequent cluster does not appear, a cluster whose element coincidence with the most frequent cluster is a predetermined threshold Th1, for example, 3/4 or more, is classified as the most frequent cluster. For example, the degree of element coincidence with respect to the most frequent cluster may be calculated from a first ratio of the number of elements that match the element of the most frequent cluster among the clusters to be compared with the most frequent cluster with respect to the total number of elements included in the most frequent cluster, and a second ratio of the number of elements that match the element of the most frequent cluster to the total number of elements of the cluster to be compared with the most frequent cluster.

Sample video S1 [shake hands, adult male, adult male]
Sample video S2 [shake hands, adult male, adult male]
Sample video S3 [shake hands, adult male, adult male]
Sample video S4 [shake hands, adult male, adult male]
Sample video S5 [shake hands, adult male, adult male]
Sample video S6 [shake hands, adult male, adult male]
Sample video S7 [shake hands, adult male, adult female, adult male]

In the above example, the most frequent cluster is a set of the label of the behavior element "shake hands," the label of the appearance "adult male," and the label of the appearance "adult male." As described above, an example is given in which the degree of coincidence of elements is calculated among the most frequent cluster appearing in the sample videos S1 to S6, and a cluster which includes the label of the behavior element "shake hands" appearing in the sample video S7, the label of the appearance "adult male," and the label of the appearance "adult female."

In this case, the first ratio may be calculated as follows. That is, the total number of elements included in the most frequent cluster includes the label of the behavior element "shake hands," the label of the appearance "adult male," and the label of the appearance "adult male." In the cluster exemplified as the sample video S7, there are three elements that coincide with the element of the most frequent cluster: the label of the behavior element "shake hands," the label of the appearance "adult male," and the label of the appearance "adult male." Therefore, the first ratio may be calculated as "1" by the calculation of 3÷3. It is possible to evaluate the degree of lack of elements compared to the most frequent cluster by such a first ratio.

Further, the second ratio may be calculated as follows. That is, the total number of clusters exemplified as the sample video S7 is four: the label of the behavior element "shake elements," the label of the appearance "adult male," the label of the appearance "adult female," and the label of the appearance "adult male." Further, in the cluster exemplified as the sample video S7, there are three elements that coincide with the element of the most frequent cluster: the label of the behavior element "shake hands," the label of the appearance "adult male," and the label of the appearance "adult male." Therefore, the second ratio may be calculated as "3/4" by the calculation of 3÷4. It is possible to evaluate the degree of excess of elements compared to the most frequent cluster by such a second ratio.

For example, the degree of element coincidence with the most frequent cluster may be calculated as 3/4 by a calculation of multiplying the first ratio and the second ratio, that is, 1×(3/4). In this case, since the degree of coincidence is equal to or higher than the threshold Th1, the cluster exemplified as the sample video S7 may be classified into the most frequency cluster. As a result, the appearance frequency of the most frequent cluster may be counted as the highest frequency "7" corresponding to all the sample videos S1 to S7.

(Rule Usage Example)

Figure 8:
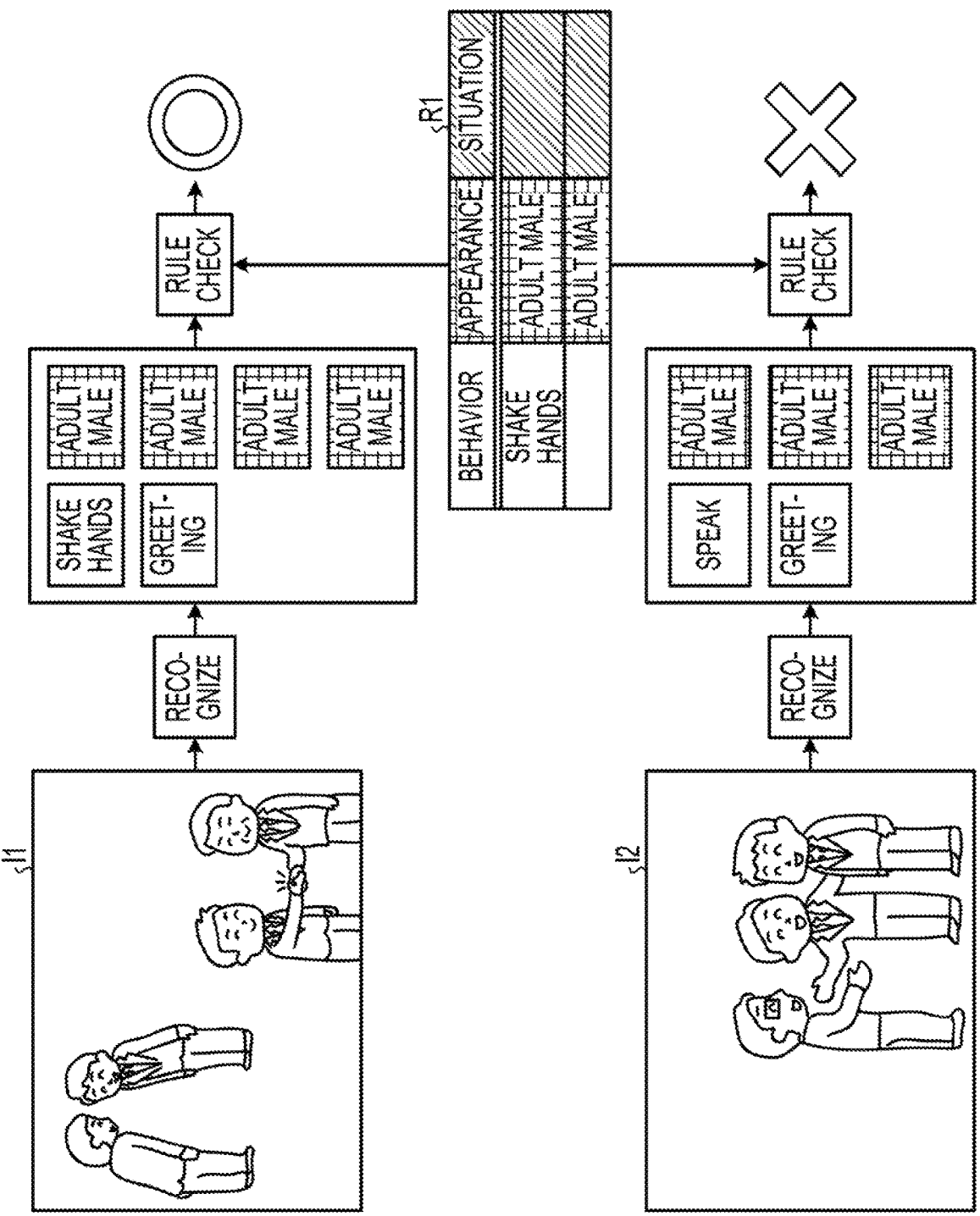
FIG. 8 is a diagram illustrating an example of a video search.

Hereinafter, an example of a video search will be described with reference to FIG. 8. FIG. 8 is a diagram illustrating an example of the video search. FIG. 8 illustrates an example in which the rule R1 illustrated in FIG. 7 is used by the video search apparatus 30. On the upper side of FIG. 8, an example is illustrated in which a sample video including a frame I1 is input to three pre-trained models of the behavior recognition model M1, the appearance discrimination model M2, and the situation recognition model M3. Meanwhile, on the lower side of FIG. 8, an example is illustrated in which a sample video including a frame I2 is input to three pre-trained models of the behavior recognition model M1, the appearance discrimination model M2, and the situation recognition model M3.

For example, when the sample video including the frame I1 is input to the above three pre-trained models, the pre-trained models output the following six labels. That is, the label of the behavior element "shake hands," the label of the behavior element "greeting," the label of the appearance "adult male," the label of the appearance "adult male," the label of the appearance "adult male," and the label of the appearance "adult male" are obtained. In this case, the label of the behavior element "shake hands," the label of the appearance "adult male," and the label of the appearance "adult male" defined in the rule R1 are included. Therefore, a frame image including the label of the behavior element "shake hands," the label of the appearance "adult male," and the label of the appearance "adult male" may be searched from the sample video as a video corresponding to a specific scene.

In the meantime, when the sample video including the frame I2 is input to the three pre-trained models, the pre-trained models output the following five labels. That is, the label of the behavior element "speak," the label of the behavior element "greeting," the label of the appearance "adult male," the label of the appearance "adult male," and the label of the appearance "adult male" are obtained. In this case, the label of the behavior element "shake hands" defined in the rule R1 is not included. Therefore, a video search result corresponding to a specific scene may not be obtained from the sample video.

(Process Flow)

Figure 9:
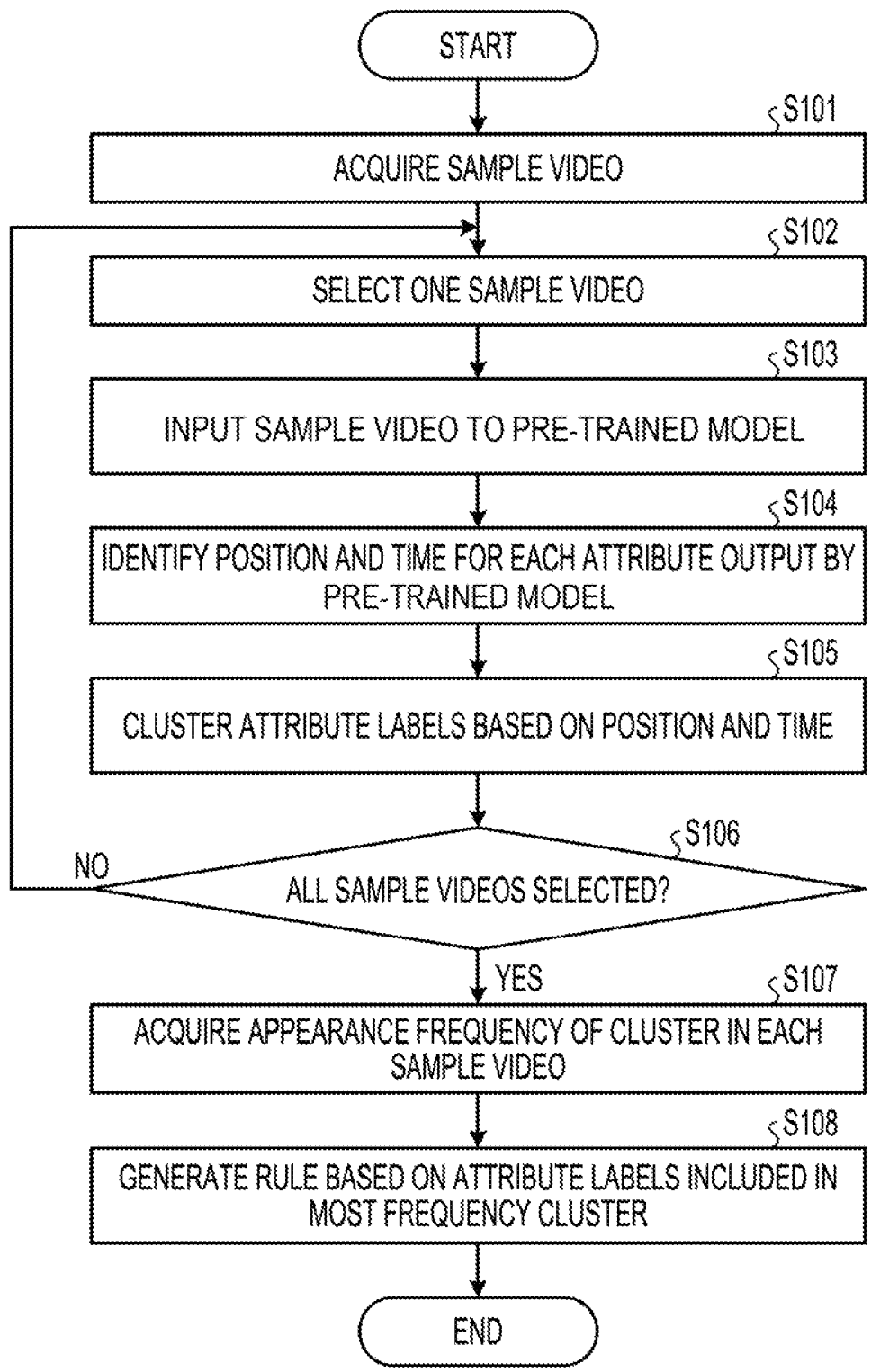
FIG. 9 is a flowchart illustrating a rule generation processing procedure according to the first embodiment.

FIG. 9 is a flowchart illustrating a rule generation processing procedure according to the first embodiment. This process is started as an example only when a data set including a plurality of sample videos is additionally registered in the sample video data 13A in the storage unit 13, or when a rule generation request is received.

As illustrated in FIG. 9, when the data set including a plurality of sample videos is acquired by the acquisition unit 15A (step S101), the model execution unit 15B selects one of the plurality of sample videos included in the data set (step S102). Subsequently, the model execution unit 15B inputs the sample video selected in step S102 to the pre-trained model (step S103).

Thereafter, the identification unit 15C identifies the position and time at which the object corresponding to the attribute appears in the sample video for each attribute label for which the pre-trained model is output (step S104). Subsequently, the clustering unit 15D clusters the attribute labels based on the position and time of each attribute label (step S105).

Further, until all the sample videos are selected ("No" in step S106), the processes from step S102 to step S105 are repeatedly executed. Thereafter, when all the sample videos are selected ("Yes" in step S106), the generation unit 15E generates a rule based on a cluster having the highest frequency of appearance among the cluster groups obtained for all the sample videos (step S107), and ends the process.

(Aspect of Effect)

As described above, the rule generation apparatus 10 according to the present embodiment clusters the attribute labels based on the position and time at which the object corresponding to the attribute output from the pre-trained model in which the sample video is input for each sample video appears in the sample video. In addition, the rule generation apparatus 10 according to the present embodiment generates a rule based on a cluster having the highest frequency of appearance among the cluster groups obtained for all the sample videos as a result of clustering for each sample video.

Therefore, in the rule generation apparatus 10 according to the present embodiment, it is possible to reduce the cost of training data. Further, in the rule generation apparatus 10 according to the present embodiment, it is possible to generate a rule by combining attribute labels corresponding to a specific scene even when the sample video includes noise other than the specific scene.

Second Embodiment

Although the embodiments related to the disclosed apparatus have been described above, the present disclosure may be implemented in various different forms other than the above-described embodiments. Therefore, another embodiment included in the present disclosure will be described below.

(Number of Pre-trained models)

In the above first embodiment, an example using three pre-trained models has been described as an example, but the number of pre-trained models may be one, two, or four or more. For example, an example is given in which a rule is generated by a combination of attribute labels output by a single pre-trained model. As an example of a specific scene, when a video search is performed for a scene in which there is a group of multiple students wearing school uniforms in a commercial facility, etc., sample videos with multiple students wearing school uniforms are prepared, and it is possible to apply the appearance discrimination model M2 that may output the label "school uniform" to the sample video. Thus, it is possible to generate a rule in which the label of the appearance "school uniform" and the label of the appearance "school uniform" are connected by the AND condition. As a result, when rules are created manually, it is possible to save time and labor for sequentially selecting uniform colors and the like when there are many candidates for rules.

(Distribution and Integration)

In addition, each component of the illustrated apparatus does not necessarily have to be physically configured as illustrated. That is, the specific forms of distribution and integration of respective units are not limited to those illustrated in the drawings, but all or a part thereof may be distributed or integrated functionally or physically in arbitrary units according to various loads, usage situations, or the like. For example, the acquisition unit 15A, the model execution unit 15B, the identification unit 15C, the clustering unit 15D, the generation unit 15E, or the notification unit 15F may be configured to be connected as an external device of the rule generation apparatus 10 via a network. In addition, the functions of the rule generation apparatus 10 described above may be configured to be implemented by another device having the acquisition unit 15A, the model execution unit 15B, the identification unit 15C, the clustering unit 15D, the generation unit 15E, or the notification unit 15F and connected to each other through a network.

(Rule Generation Program)

Further, the various processes described in the above embodiments may be implemented by executing a prepared program on a computer such as a personal computer or a workstation. Therefore, in the following, an example of a computer that executes a rule generation program having the same function as in the above embodiment will be described with reference to FIG. 10.

Figure 10:
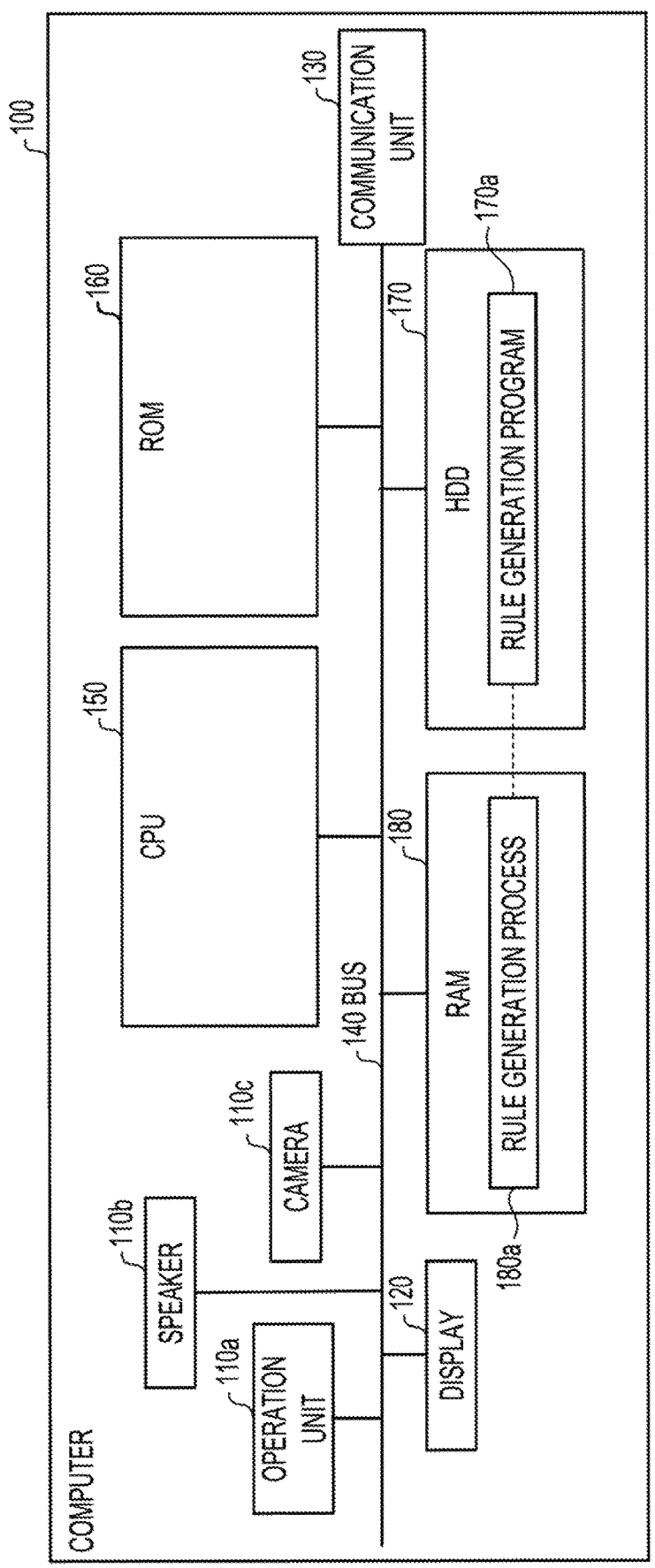
FIG. 10 is a diagram illustrating an example of a functional configuration of a computer that executes a rule generation program according to the first and second embodiments.

FIG. 10 is a diagram illustrating an example of a hardware configuration of a computer that executes a rule generation program according to the first and second embodiments. As illustrated in FIG. 10, the computer 100 includes an operation unit 110a, a speaker 110b, a camera 110c, a display 120, and a communication unit 130. Further, the computer 100 includes a CPU 150, a ROM 160, an HDD 170, and a RAM 180. Each of the units 110 to 180 are connected via a bus 140.

As illustrated in FIG. 10, the HDD 170 stores a rule generation program 170a that exhibits the same functions as the acquisition unit 15A, the model execution unit 15B, the identification unit 15C, the clustering unit 15D, and the generation unit 15E illustrated in the first embodiment. The rule generation program 170a may be integrated or separated as with each component of the acquisition unit 15A, the model execution unit 15B, the identification unit 15C, the clustering unit 15D, and the generation unit 15E illustrated in FIG. 1. That is, the HDD 170 does not necessarily have to store all the data illustrated in the first embodiment, and data used for processing may be stored in the HDD 170.

Under such an environment, the CPU 150 reads the rule generation program 170a from the HDD 170 and deploys the program in the RAM 180. As a result, the rule generation program 170a functions as a rule generation process 180a as illustrated in FIG. 10. The rule generation process 180a deploys various data read from the HDD 170 in an area allocated to the rule generation process 180a in the storage area of the RAM 180, and executes various processes using the various data that have been deployed. For example, the process, etc. illustrated in FIG. 9 is included as an example of the process executed by the rule generation process 180a. Meanwhile, in the CPU 150, all the processing units illustrated in the first embodiment do not necessarily have to be operated, and a processing unit corresponding to a process to be executed may be virtually implemented.

In the meantime, the above rule generation program 170a may not necessarily be stored in the HDD 170 or the ROM 160 from the beginning. For example, the rule generation program 170a may be stored in a "portable physical medium" such as a flexible disk inserted into the computer 100, so-called FD, CD-ROM, DVD disk, magneto-optical disk, IC card, or the like. Then, the computer 100 may be configured to acquire and execute the rule generation program 170a from the portable physical medium. Further, the rule generation program 170a may be stored in another computer, a server apparatus, or the like connected to the computer 100 via a public line, the Internet, a LAN, a WAN, etc., and the computer 100 may acquire and execute the rule generation program 170a from the components.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:

a memory; and a processor coupled to the memory and the processor configured to:

acquire a plurality of sample videos;

identify a position and time at which an attribute appears in each of the plurality of sample videos, a plurality of labels of the attribute being output by each of one or more pre-trained models to which each of the plurality of sample videos is input;

perform a clustering of the plurality of labels of the attribute based on the position and time of the attribute for each of the plurality of sample videos such that a plurality of clusters is classified according to the attribute, respectively, and each of the plurality of clusters is provided with one or more of the plurality of labels of the attribute; and generate a rule by combining one or more of the plurality of labels of the attribute that are included in a cluster having a highest frequency of appearance among cluster groups obtained for all of the plurality of sample videos.

2. The information processing apparatus according to claim 1, wherein the processor is further configured to identify, as the position of the attribute, a representative value of coordinates of a center point of an object corresponding to the attribute for frames of a sample video in which the object appears.

3. The information processing apparatus according to claim 1, wherein the processor is further configured to identify, as the time of the attribute, a set of sample video frames in which an object corresponding to the attribute appears.

4. The information processing apparatus according to claim 1, wherein the processor is further configured to classify, as a first cluster having the highest frequency, a second cluster among cluster groups obtained from sample videos in which the first cluster does not appear, the second cluster having a degree of element coincidence with the first cluster that is equal to or higher than a predetermined threshold.

5. The information processing apparatus according to claim 1, wherein the processor is further configured to:
acquire additional sample videos; and
search, among the additional sample videos, a target video including one or more labels of the attribute that is in common with the one or more of the plurality of labels of the attribute combined in the rule.

6. A rule generation method comprising:
acquiring, by a computer, a plurality of sample videos;
identifying a position and time at which an attribute appears in each of the plurality of sample videos, a plurality of labels of the attribute being output by each of one or more pre-trained models to which each of the plurality of sample videos is input;
performing a clustering of the plurality of labels the attribute based on the position and time of the attribute for each of the plurality of sample videos such that a plurality of clusters is classified according to the attribute, respectively, and each of the plurality of clusters is provided with one or more of the plurality of labels of the attribute; and
generating a rule by combining one or more of the plurality of labels of the attribute that are included in a cluster having a highest frequency of appearance among cluster groups obtained for all of the plurality of sample videos.

7. The rule generation method according to claim 6, further comprising:
identifying, as the position of the attribute, a representative value of coordinates of a center point of an object corresponding to the attribute for frames of a sample video in which the object appears.

8. The rule generation method according to claim 6, further comprising:
identifying, as the time of the attribute, a set of sample video frames in which an object corresponding to the attribute appears.

9. The rule generation method according to claim 6, further comprising:
classifying, as a first cluster having the highest frequency, a second cluster among cluster groups obtained from sample videos in which the first cluster does not appear, the second cluster having a degree of element coincidence with the first cluster that is equal to or higher than a predetermined threshold.

10. The rule generation method according to claim 6, further comprising:
acquiring additional sample videos; and
searching, among the additional sample videos, a target video including one or more labels of the attribute that is in common with the one or more of the plurality of labels of the attribute combined in the rule.

11. A non-transitory computer-readable recording medium having stored therein a program that causes a computer to execute a process, the process comprising:
acquiring a plurality of sample videos;
identifying a position and time at which an attribute appears in each of the plurality of sample videos, a plurality of labels of the attribute being output by each of one or more pre-trained models to which each of the plurality of sample videos is input;
performing a clustering of the plurality of labels of the attribute based on the position and time of the attribute for each of the plurality of sample videos such that a plurality of clusters is classified according to the attribute, respectively, and each of the plurality of clusters is provided with one or more of the plurality of labels of the attribute; and
generating a rule by combining one or more of the plurality of labels of the attribute that are included in a cluster having a highest frequency of appearance among the plurality of cluster groups obtained for all of the plurality of sample videos.

12. The non-transitory computer-readable recording medium according to claim 11, the process further comprising:
identifying, as the position of the attribute, a representative value of coordinates of a center point of an object corresponding to the attribute for frames of a sample video in which the object appears.

13. The non-transitory computer-readable recording medium according to claim 11, the process further comprising:
identifying, as the time of the attribute, a set of sample video frames in which an object corresponding to the attribute appears.

14. The non-transitory computer-readable recording medium according to claim 11, the process further comprising:
classifying, as a first cluster having the highest frequency, a second cluster among cluster groups obtained from sample videos in which the first cluster does not appear, the second cluster having a degree of element coincidence with the first cluster that is equal to or higher than a predetermined threshold.

15. The non-transitory computer-readable recording medium according to claim 11, the process further comprising:
acquiring additional sample videos; and
searching, among the additional sample videos, a target video including one or more labels of the attribute that is in common with the one or more of the plurality of labels of the attribute combined in the rule.

* * * * *